(12) United States Patent
Soliman et al.

(10) Patent No.: US 9,725,082 B2
(45) Date of Patent: *Aug. 8, 2017

(54) IMPLEMENTING SKIP FIRE WITH START/STOP FEATURE

(71) Applicants: Tula Technology Inc., San Jose, CA (US); FCA US LLC, Auburn Hills, MI (US)

(72) Inventors: Ihab S. Soliman, Canton, MI (US); Mark A. Shost, Northville, MI (US); Truc Trung Le, Rochester Hills, MI (US); Joseph B. Adams, Northville, MI (US)

(73) Assignees: Tula Technology, Inc., San Jose, CA (US); FCA US LLC, Auburn Hills, MI (US)

( * ) Notice: Subject to any disclaimer, the term of this patent is extended or adjusted under 35 U.S.C. 154(b) by 175 days.

This patent is subject to a terminal disclaimer.

(21) Appl. No.: 14/743,656

(22) Filed: Jun. 18, 2015

(65) Prior Publication Data

US 2015/0369141 A1 Dec. 24, 2015

Related U.S. Application Data

(60) Provisional application No. 62/014,526, filed on Jun. 19, 2014.

(51) Int. Cl.
*F02P 5/00* (2006.01)
*B60W 20/00* (2016.01)
(Continued)

(52) U.S. Cl.
CPC ............ *B60W 20/00* (2013.01); *B60W 10/06* (2013.01); *F02D 17/02* (2013.01); *F02D 29/02* (2013.01);
(Continued)

(58) Field of Classification Search
CPC ............ F02D 17/02; F02D 2200/0406; F02N 11/0829; F02N 2200/022; F02P 5/1506; Y02T 10/46; Y02T 10/48
(Continued)

(56) References Cited

U.S. PATENT DOCUMENTS 2,875,742 A 3/1959 Dolza
4,434,767 A 3/1984 Kohama et al.
(Continued)

FOREIGN PATENT DOCUMENTS

JP 2011007139 * 1/2011
JP 2011106378 * 6/2011

OTHER PUBLICATIONS

International Search Report dated Sep. 21, 2015 from International Application No. PCT/US2015/03666.
(Continued)

*Primary Examiner* — Marguerite McMahon
*Assistant Examiner* — Tea Holbrook
(74) *Attorney, Agent, or Firm* — Beyer Law Group LLP

(57) ABSTRACT

A variety of methods and arrangements for implementing a start/stop feature in a skip fire engine control system are described. In one aspect, the implementation of the start/stop feature involves automatically turning off an internal combustion engine under selected circumstances during a drive cycle. A determination is made that the engine should be restarted. During the engine startup period, the engine is operated in a skip fire manner such that a desired engine speed is reached.

24 Claims, 9 Drawing Sheets

(51) Int. Cl.
  *F02D 17/02* (2006.01)
  *B60W 10/06* (2006.01)
  *F02D 29/02* (2006.01)
  *F02D 41/30* (2006.01)
  *F02N 11/08* (2006.01)
  *F02P 5/15* (2006.01)
  *F02N 11/04* (2006.01)

(52) U.S. Cl.
  CPC ...... *F02D 41/3058* (2013.01); *F02N 11/0829* (2013.01); *F02P 5/1506* (2013.01); *F02D 2200/0406* (2013.01); *F02N 11/04* (2013.01); *F02N 2011/0896* (2013.01); *F02N 2200/022* (2013.01); *Y02T 10/46* (2013.01); *Y02T 10/48* (2013.01); *Y10S 903/905* (2013.01)

(58) Field of Classification Search
  USPC .................................. 123/406.2, 406.25
  See application file for complete search history.

(56) References Cited

U.S. PATENT DOCUMENTS

| | | | |
|---|---|---|---|
| 4,489,695 A | 12/1984 | Kohama et al. | |
| 4,509,488 A | 4/1985 | Forster et al. | |
| 5,377,631 A | 1/1995 | Schechter | |
| 5,690,073 A | 11/1997 | Fuwa | |
| 6,158,411 A | 12/2000 | Morikawa | |
| 6,257,207 B1 | 7/2001 | Inui et al. | |
| 6,568,372 B1 | 5/2003 | Kanno | |
| 6,571,772 B1 | 6/2003 | Ott et al. | |
| 6,619,258 B2 | 9/2003 | McKay et al. | |
| 6,772,724 B2 | 8/2004 | Glugla et al. | |
| 6,823,830 B2 | 11/2004 | Azuma | |
| 6,935,295 B2 | 8/2005 | Marriott | |
| 7,000,602 B2 | 2/2006 | Cullen et al. | |
| 7,032,572 B2 | 4/2006 | Bidner et al. | |
| 7,032,581 B2 | 4/2006 | Gibson et al. | |
| 7,051,693 B2 | 5/2006 | Tetsuno et al. | |
| 7,063,062 B2 | 6/2006 | Lewis et al. | |
| 7,066,136 B2 | 6/2006 | Ogiso | |
| 7,086,386 B2 | 8/2006 | Doering | |
| 7,124,743 B2 | 10/2006 | Gonzales, Jr. et al. | |
| 7,165,520 B2 | 1/2007 | Lewis et al. | |
| 7,167,792 B1 | 1/2007 | Kolmanovsky et al. | |
| 7,184,879 B1 | 2/2007 | Lewis | |
| 7,249,583 B2 | 7/2007 | Bidner et al. | |
| 7,458,346 B2 | 12/2008 | Gibson | |
| 7,503,312 B2 | 3/2009 | Surnilla et al. | |
| 7,765,806 B2 | 8/2010 | Clark | |
| 7,867,134 B2 | 1/2011 | Choi | |
| 7,930,087 B2 | 4/2011 | Gibson et al. | |
| 7,931,002 B1 | 4/2011 | Gibson et al. | |
| 7,949,461 B2 | 5/2011 | Takahashi | |
| 8,099,224 B2 | 1/2012 | Tripathi et al. | |
| 8,215,284 B2 | 7/2012 | Suzuki et al. | |
| 8,225,771 B2 | 7/2012 | Aso et al. | |
| 8,529,403 B2 | 9/2013 | Nedorezov et al. | |
| 8,689,541 B2 | 4/2014 | McDonald et al. | |
| 8,701,628 B2* | 4/2014 | Tripathi | F02D 37/02 123/350 |
| 8,839,766 B2 | 9/2014 | Serrano et al. | |
| 9,086,020 B2 | 7/2015 | Tripathi et al. | |
| 9,387,849 B2 | 7/2016 | Soliman et al. | |
| 2001/0047792 A1 | 12/2001 | Akazaki et al. | |
| 2002/0195087 A1 | 12/2002 | Dunsworth et al. | |
| 2005/0199220 A1 | 9/2005 | Ogiso | |
| 2005/0205069 A1* | 9/2005 | Lewis | F01L 1/38 123/491 |
| 2007/0082782 A1* | 4/2007 | Eguchi | F16H 59/14 477/77 |
| 2009/0150055 A1 | 6/2009 | Kaiser et al. | |
| 2009/0301060 A1 | 12/2009 | Kennie et al. | |
| 2009/0308674 A1* | 12/2009 | Bhattarai | B60W 10/06 180/65.265 |
| 2010/0010724 A1* | 1/2010 | Tripathi | F02D 41/0087 701/103 |
| 2010/0043744 A1 | 2/2010 | Suzuki et al. | |
| 2010/0050993 A1 | 3/2010 | Zhao et al. | |
| 2011/0073069 A1* | 3/2011 | Marriott | F02P 5/1508 123/406.12 |
| 2011/0202262 A1 | 8/2011 | Gibson et al. | |
| 2011/0213540 A1* | 9/2011 | Tripathi | F02D 37/02 701/102 |
| 2011/0295489 A1 | 12/2011 | Ma et al. | |
| 2012/0109495 A1 | 5/2012 | Tripathi et al. | |
| 2012/0204827 A1 | 8/2012 | Sieber et al. | |
| 2013/0096759 A1 | 4/2013 | Breton et al. | |
| 2013/0139776 A1 | 6/2013 | Pursifull et al. | |
| 2013/0276749 A1* | 10/2013 | Springer | F02D 17/02 123/349 |
| 2014/0116379 A1* | 5/2014 | Maruyama | B60K 26/021 123/349 |
| 2015/0203118 A1* | 7/2015 | Mitsuyasu | B60W 10/02 701/67 |
| 2015/0252743 A1* | 9/2015 | Glugla | F02D 41/1498 701/104 |
| 2015/0260117 A1* | 9/2015 | Shost | F02D 41/0087 123/481 |
| 2015/0345407 A1* | 12/2015 | Glugla | F02D 17/02 123/403 |
| 2015/0369180 A1* | 12/2015 | Leone | F02N 11/0803 123/52.1 |

OTHER PUBLICATIONS

Written Opinion dated Sep. 21, 2015 from International Application No. PCT/US2015/03666.
International Search Report dated Sep. 16, 2015 from International Application No. PCT/US2015/03668.
Written Opinion dated Sep. 16, 2015 from International Application No. PCT/US2015/03668.

* cited by examiner

IMPLEMENTING SKIP FIRE WITH START/STOP FEATURE

CROSS REFERENCE TO RELATED APPLICATIONS

This application claims priority of U.S. Provisional Patent Application No. 62/014,526, entitled "Implementing Skip Fire with Start/Stop Feature," filed Jun. 19, 2014, which is incorporated herein in its entirety for all purposes.

FIELD OF INVENTION

The present invention relates to a skip fire engine control system for an internal combustion engine. More specifically, the present invention relates to a start/stop feature for a skip fire engine control system.

BACKGROUND

There are various ongoing efforts to improve the fuel efficiency of internal combustion engines. One approach involves a start/stop feature, which is implemented in an increasing number of vehicles. In a conventional vehicle, when a vehicle comes to a stop (e.g., at a traffic light or stop sign), the internal combustion engine continues to run at an idle speed, which consumes fuel. In vehicles equipped with a start/stop feature, when the vehicle comes to a stop and other selected conditions are satisfied, the internal combustion engine automatically shuts down to conserve fuel. When the driver releases the brake pedal and/or activates the accelerator pedal, the engine restarts. There may be other selected conditions that can trigger an engine restart.

Some vehicles with a start/stop feature utilize an integrated starter-generator (ISG). The integrated starter-generator combines the functionality of an electric starter motor with that of an electric generator. That is, the integrated starter-generator is capable of subtracting torque from the engine to charge a battery by converting the engine's mechanical energy into electrical energy. The ISG is also capable of converting battery electrical energy into mechanical energy, which can be used to help restart the engine in a start/stop system. An ISG is typically integrated with the crankshaft or mechanically coupled to rotation of the crankshaft via a belt, chain or gear drive system. A belt alternator starter system with an ISG is one example of such a system.

SUMMARY OF THE INVENTION

A variety of methods and arrangements for implementing a start/stop feature in a skip fire engine control system are described. In one aspect, the implementation of the start/stop feature involves automatically turning off an internal combustion engine under selected circumstances. A determination is made as to whether the engine should be restarted. During the engine startup period, the engine is operated in a skip fire manner such that a desired engine speed is reached. In some embodiments, skip fire operation is based on an engine speed restart profile.

When an engine is shut off due to implementation of a start/stop feature, the manifold pressure tends to equalize with the barometric pressure. Thus, if the engine is restarted in an all cylinder mode (i.e., by firing all of the cylinders, as is the case in conventional, non-skip fire engines), there may be an undesirable engine speed and torque "surge" that is noticeable to occupants of the vehicle. This occurs since all of the cylinder firings are initiating when the intake manifold absolute pressure (MAP) is initially at or near barometric pressure. In various embodiments of the present invention, less than all of the working chambers are fired. That is, the firing fraction or ratio of firings to firing opportunities is adjusted to help prevent an engine speed and torque surge. In some embodiments, the firing fraction is dynamically adjusted during an engine start phase based on the manifold absolute pressure, engine speed, oil temperature, coolant temperature or any other suitable operating parameter. In other embodiments, the firing fraction is adjusted in a predetermined manner.

In another aspect of the invention, a stop/start feature is implemented. During an engine shutdown period in which the engine speed is dropping from a non-zero speed to a speed of zero, the engine is operated in a skip fire manner until the engine speed reaches zero.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
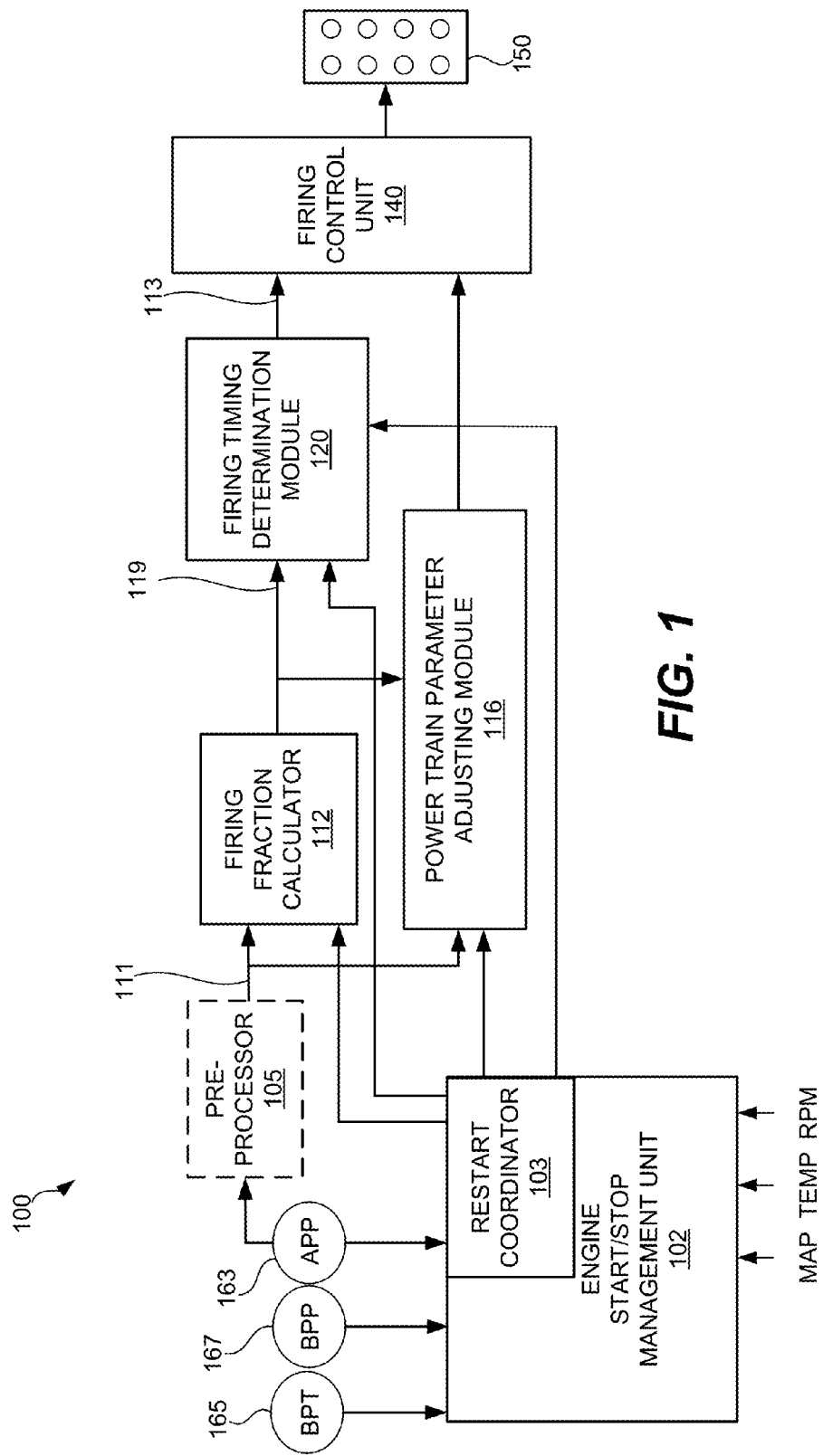
FIG. 1 is a block diagram of a skip fire engine controller implementing a start/stop feature according to one embodiment of the present invention.

Start/stop systems have become increasingly prevalent in automobiles. A start/stop system involves automatically turning off an engine when selected conditions are met during a drive cycle. A drive cycle is initiated by a key action and terminated by a key action. Within a drive cycle the engine may automatically stop and restart many times. For example, an engine might be automatically turned off when the vehicle comes to a halt at a red light or stop sign in the middle of a drive cycle. The engine is then typically restarted when the driver requests torque by depressing an accelerator pedal, releases a brake pedal, and/or shifts transmission gear (i.e. forward to reverse or vice versa). The engine may be restarted by a non-driver activated trigger, such insufficient brake vacuum boost or insufficient charge in a battery. Turning off the engine when it is not needed improves fuel efficiency relative to a conventional engine, which continues to run even when it is not needed, for example, idling during vehicle stops. Additionally, in cases of a vehicle with a hybrid engine, the internal combustions engine may be stopped and restarted while the vehicle is in motion.

One challenge involved in a start/stop system arises when the engine is restarted. While the engine is turned off, the manifold absolute pressure tends to equalize with the barometric pressure. As a result, when the brake pedal is released and the engine is restarted, a large amount of air is delivered into the cylinders. In a conventional engine that fires all of its working chambers during each engine cycle, this can lead to an undesirable engine speed and/or torque "surge," which can be perceived by passengers in the vehicle. One known method to reduce this torque surge in a spark ignition engine is to retard the spark timing. While this maintains combustion stability and reduces the torque surge it wastes fuel, since the combustion energy is inefficiently generating motive force. Here working chamber refers generally to a combustion chamber, which may be a cylinder or some other enclosed volume surrounding a combustion region.

The present invention involves using skip fire engine control to help reduce or eliminate this engine speed and torque surge, thus allowing for a smoother start/stop transition. In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions.

While generally considered to be more fuel efficient, skip fire engine control offers another advantage in the context of an automatic engine start/stop system. The ratio of firings to firing opportunities can be adjusted in a skip fire engine control system to regulate the engine output during an engine restart or shortly after the restart. For example, the firing fraction can be lower when the manifold absolute pressure is high, and be allowed to increase when the manifold absolute pressure decreases over time as the engine is restarting and speed is increasing. In this way, engine output can be better controlled and undesirable surges in engine speed and torque can be avoided. In some embodiments spark timing may be adjusted at or near a timing corresponding to minimum brake specific fuel consumption (bsfc). This condition optimizes fuel efficiency.

Referring initially to FIG. 1, an example skip fire engine controller 100 that implements a start/stop feature will be described. The skip fire engine controller includes a firing fraction calculator 112, a firing timing determination module 120, a firing control unit 140, an engine start/stop management unit 102 and a power train parameter adjusting module 116. The illustrated engine controller 100 may be used in any skip fire-capable engine system.

The engine start/stop management unit 102 is arranged to implement the start/stop feature for the engine. The engine start/stop management unit 102 determines whether the engine should be automatically shut down or restarted in accordance with the start/stop system. Such a shutdown generally occurs only under selected conditions e.g., when a vehicle has come to a complete stop, when a vehicle is at low speed (e.g. <5 km/hr) and a complete stop is anticipated, when ambient and engine temperature conditions are suitable, when the operator of the vehicle has pressed the brake pedal and released the accelerator pedal, etc. The engine start/stop management unit receives any inputs necessary to make the aforementioned shutdown determination. These inputs are derived from a variety of sources, including but not limited to a brake pedal travel (BPT) sensor 165, a brake pedal pressure (BPP) sensor 167, a vehicle speed sensor, an accelerator pedal position (APP) 163 sensor, a temperature sensor, etc.

The engine start/stop management unit 102 also is arranged to help control stopping and restarting of an engine during a drive cycle. In the illustrated embodiment, the engine stop/start management unit 102 receives additional inputs indicating various operating parameters including, but not limited to, the manifold absolute pressure (MAP), engine speed (RPM), the coolant temperature and/or the oil temperature. Based on these inputs, the engine start/stop management unit determines how the engine should be operated during restart. More specifically, the engine start/stop management unit 102 is arranged to determine suitable conditions for stopping and restarting the engine. In some implementations, a restart coordinator 103 is included as part of the engine stop/start management unit 102. The restart coordinator 103 determines an engine speed restart profile or trajectory during a restart suitable for the current engine and ambient conditions.

The engine speed restart profile may take a variety of forms. In some embodiments, for example, each engine speed restart profile indicates or controls how engine speed will be managed during restart. By way of example, a particular profile may require a predetermined increase in the engine speed over time. In some embodiments, a engine speed restart profile designates different engine speeds at different times during the engine startup period. Different profiles may require that the engine speed is increased at different rates during an engine startup period. The engine speed restart profile may also determine other related engine parameters during restart. Some designs, for example, involve profiles that require different rates of increase in a skip fire firing fraction over time (e.g., as discussed below in connection with FIG. 6.) In various implementations, the restart coordinator selects one of the profiles based on a variety of operating parameters e.g., accelerator pedal position. In some embodiments, the engine start/stop management unit 102 seeks to operate the engine in a manner such that the engine speed during the restart period substantially follows the desired engine speed restart profile (e.g., such that the actual engine speed matches engine speed levels and/or engine speed changes over time that are indicated/designated by the profile.)

The restart coordinator 103 sends information regarding the restart to the firing fraction calculator 112 which determines a suitable firing fraction or firing sequence used to operate the engine. The restart coordinator 103 may establish a restart trajectory which will help prevent an engine speed surge that can arise during or after the restart of the engine. The restart coordinator 103 controls the engine by sending control signals to the firing fraction calculator 112, the firing timing determination unit 120 and/or the power train parameter adjusting module 116 as appropriate.

In addition to input from the engine start/stop management unit 102, the firing fraction calculator 112 also receives a torque request signal 111 based on the current accelerator pedal position, engine speed and other inputs. The torque request signal may be directed from the APP 163 through an optional pre-processor 105 before reaching the firing fraction calculator 112. The torque request signal 111, which indicates a request for a desired engine output, may be received or derived from an accelerator pedal position sensor or other suitable sources, such as a cruise controller, a torque calculator, an ECU, etc. An optional pre-processor 105 may modify the accelerator pedal signal prior to delivery to the firing fraction calculator 112. However, it should be appreciated that in other implementations, the accelerator pedal position sensor may communicate directly with the firing fraction calculator 112.

Based on the torque request signal 111, the firing fraction calculator 112 determines a skip fire firing fraction that would be appropriate to deliver the desired output under selected engine operations. The firing fraction 112 is indicative of the fraction or percentage of firings under the current (or directed) operating conditions that are required to deliver the desired output. In some preferred embodiments, the firing fraction may be determined based on the percentage of optimized firings that are required to deliver the driver requested engine torque (e.g., when the cylinders are firing at an operating point substantially optimized for fuel efficiency). However, in other instances, different level reference firings, firings optimized for factors other than fuel efficiency, the current engine settings, etc. may be used in determining the appropriate firing fraction.

During various implementations of a start/stop feature, the engine restart coordinator 103 helps control the firing fraction generated by the firing fraction calculator 112. As previously discussed, when a start/stop feature is implemented, the engine is shut down automatically, which allows the manifold absolute pressure to rise. As a result, when firings begin again, the torque generated per cylinder firing is initially high. As firings continue, the manifold absolute pressure and torque generated per firing tend to decline, since the firings draw air out of the intake manifold. In various embodiments, to help compensate for the initial increased torque generation, the restart coordinator 103 instructs the firing fraction calculator 112 to start at a low firing fraction and steadily increase the firing fraction during the engine start phase.

The adjustment of the firing fraction during the engine start phase may be performed in a variety of ways, depending on the needs of a particular application. In some embodiments, for example, the restart coordinator 103 and/or the firing fraction calculator 112 selects a suitable engine speed restart profile from a set of possible engine speed restart profiles. Each profile indicates a partially or completely predetermined sequence of changes or increases in the firing fraction that should be implemented during the engine start phase. In other embodiments, the firing fraction is adjusted dynamically in a closed loop system. Some implementations involve a restart coordinator 103 and/or firing fraction calculator 112 that is arranged to dynamically adjust the firing fraction during the engine start phase based on one or more engine parameters, including but not limited to manifold absolute pressure, engine speed, coolant temperature, and oil temperature.

Figure 6:
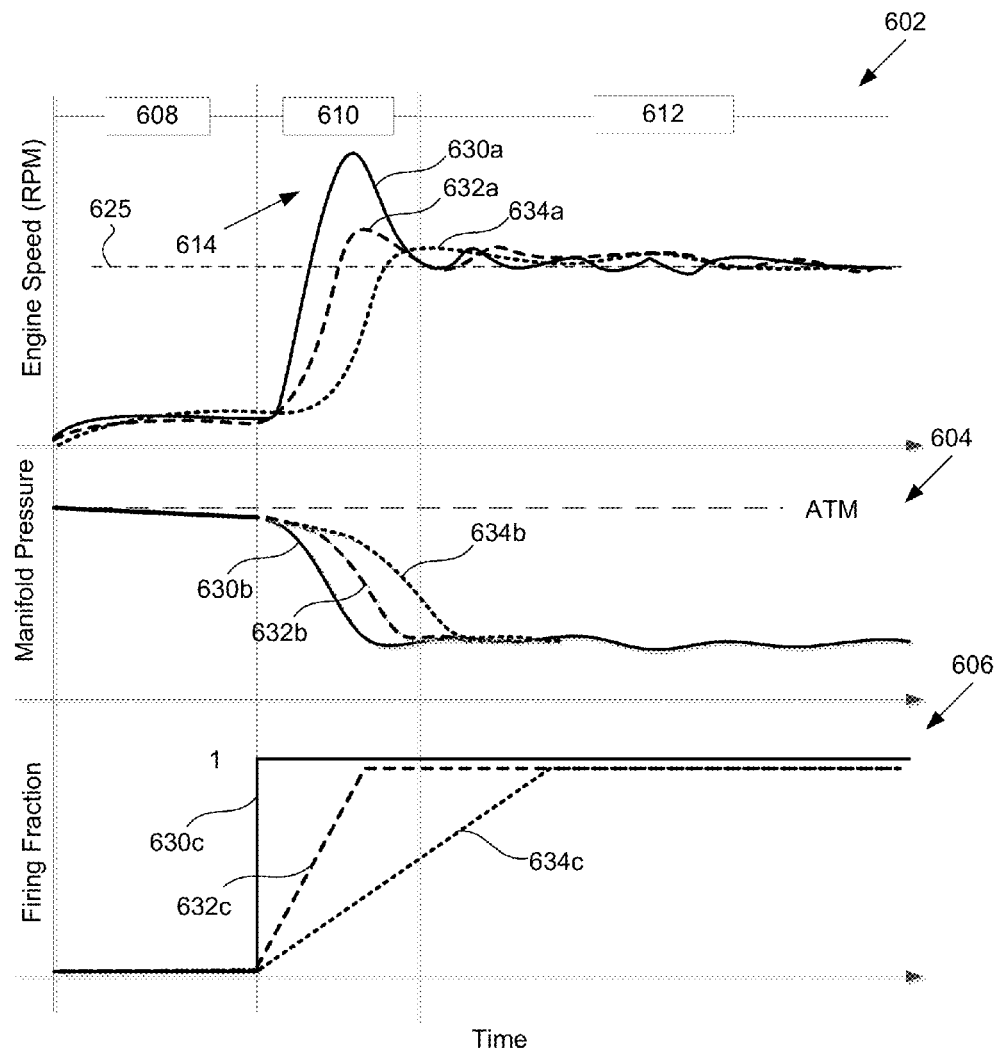
FIG. 6 is a graph that diagrammatically illustrates changes in engine speed, manifold absolute pressure and firing fraction over time according to a particular embodiment of the present invention.

An example operation of an engine 150 and the engine controller 100 during implementation of a start/stop feature is illustrated in FIG. 6. FIG. 6 illustrates three graphs 602/604/606 that indicate changes in engine speed, manifold pressure and firing fraction over time. These changes are plotted over three time periods: the crank phase 608, the engine start phase 610 and the engine idle phase 612. The crank phase 608 represents an initial period of a restart following shutdown of the engine in which a conventional starter is used to crank the engine. The engine start phase 610 represents a period of time that immediately follows the crank phase 608 and during which time working chambers are fired in a skip fire manner to reach an idle engine speed. The engine idle phase 612 represents a time period that follows the start phase 610, during which the engine is running at an idle speed.

Within each graph are three curves, denoted by a solid line (630a, 630b, and 630c), a dashed line (632a, 632b, and 632c), and a dotted line (634a, 634b, and 634c). The solid line indicates a conventional, non-skip fire engine that fires all of its cylinders during any given engine cycle. The dashed and dotted lines represent various implementations of the present invention in which a skip fire engine control system is used to restart the engine.

During the crank phase 608, a conventional starter is used to restart the engine and the working chambers are not fired. For both the skip fire and non-skip fire engine systems, the manifold absolute pressure, as indicated by graph 604, is at atmospheric pressure while the engine is shut down due to equilibration of the intake manifold pressure with barometric pressure. That is, since the engine is shut down and no firings are taking place that draw air out of the intake manifold, the intake manifold absolute pressure equalizes to atmospheric pressure. During the cranking phase, the manifold absolute pressure decreases to slightly below barometric pressure while the engine is rotating at the cranking speed.

During the start phase 610, the engine is restarted and the working chambers begin firing. In the conventional, non-skip fire engine, as denoted by the solid line 630a in the graph 606, this results in the immediate firing of all working chambers (i.e., firing fraction=1). This, combined with the high manifold absolute pressure, causes an engine torque surge and the engine speed to abruptly increase beyond a desirable target speed 625, as shown by the engine speed overshoot 614. In some embodiments, the target speed corresponds to an engine idle speed. This engine speed surge can be sufficiently abrupt to be noticeable to passengers in a vehicle.

Skip fire control helps to address this issue. As shown by the dotted 632a and dashed 634a lines in graph 606, the firing fraction in these approaches is increased more gradually. That is, the firing fraction starts at a low level and gradually increases. Generally, as firings continue, the manifold pressure tends to drop, as shown in graph 604, and the firing fraction for the skip fire approaches tend to increase, as shown in graph 606. In various implementations, the firing fraction is dynamically adjusted based at least in part on the manifold absolute pressure. The initially lower firing fractions helps compensate for the initial high manifold pressure and help reduce engine output at the beginning of the start phase 610 relative to the non-skip fire, conventional approach. As a result, there is no or limited engine speed overshoot for the skip fire approaches during the start phase 610, as shown by the dotted 634a and dashed 632a curves in graph 602.

FIG. 6 also indicates two different engine speed restart profiles, which are represented in the graphs by the dashed line (632a, 632b, and 632c) and dotted line (634a, 634b, and 634c) lines. Each engine speed restart profile indicates different paths by which the firing fraction can be increased during the start phase 610. As shown by the dashed line 632*c* in graph 606, in one approach the firing fraction is increased much more rapidly than in the other approach, dotted line 634*c*. The firing fraction calculator 112 and/or the restart coordinator 103 may select and implement one of the engine speed restart profiles based on various engine parameters. For example, if an operator rapidly depresses the accelerator pedal, it may be assumed that the operator prioritizes an increase in engine output over smoothness. Thus, an engine speed restart profile involving a steeper increase in the firing fraction (e.g., as indicated by the dash line 632*c* in graph 606) may be utilized. It should be appreciated that although only two engine skip fire restart operation profiles are illustrated, the illustrated embodiment is meant to be exemplary and many more engine speed restart profiles may be available. The engine restart firing fraction profiles may not be necessarily linear and may also depend on other inputs such as engine speed, engine oil temperature, etc.

Returning to FIG. 1, once suitable firing fractions are generated, the firing fraction calculator transmits them to the firing timing determination module 120. The firing timing determination module 120 is arranged to issue a sequence of firing commands (e.g., drive pulse signal 113) that cause the engine 150 to deliver the percentage of firings dictated by a commanded firing fraction 119. In some implementations, for example, the firing timing determination module 120 generates a bit stream, in which each 0 indicates a skip and each 1 indicates a fire for the current cylinder firing opportunity.

The firing timing determining module 120 may generate the firing sequence in a wide variety of ways. By way of example, sigma delta convertors work well as the firing timing determining module 120. In still other embodiments, the firing timing determination module selects a suitable firing sequence from a firing sequence library based on the received firing fraction. The sequence of firing commands (sometimes referred to as a drive pulse signal 113) outputted by the firing timing determination module 120 may be passed to the firing control unit which actuates and commands the actual cylinder firings.

In some implementations, after the engine has been shut down due to the implementation of a start/stop feature, the firing timing determination module 120 receives a signal from the engine start/stop management unit 102 indicating that the engine should be restarted. In response, the firing timing determination module 120 selects a particular engine speed restart profile from multiple possible profiles. Each profile indicates a predetermined firing sequence used to operate the engine during the engine start phase. Such firing sequences may involve or be based on different firing fractions and thus can generate results similar to what is shown in FIG. 6.

In the illustrated embodiment, an optional power train parameter adjusting module 116 is provided that cooperates with the firing fraction calculator 112. The power train parameter adjusting module 116 directs the firing control unit 140 to set selected power train parameters appropriately to insure that the actual engine output substantially equals the requested engine output at the commanded firing fraction. By way of example, the power train parameter adjusting module 116 may be responsible for determining the desired mass air charge (MAC) and/or other engine settings that are desirable to help ensure that the actual engine output matches the requested engine output. Of course, in other embodiments, the power train parameter adjusting module may be arranged to directly control various engine settings.

The firing fraction calculator 112, the firing timing determination module 120, the power train parameter adjusting module 116, the engine start/stop management unit 102 and the other illustrated components of the engine controller 100 may take a wide variety of different forms and their functionalities may alternatively be incorporated into an ECU, or provided by other more integrated components, by groups of subcomponents or using a wide variety of alternative approaches. In various alternative implementations, these functional blocks may be accomplished algorithmically using a microprocessor, ECU or other computation device, using analog or digital components, using programmable logic, using combinations of the foregoing and/or in any other suitable manner.

Although not required in all implementations, in some implementations the determination of the appropriate firing fraction and individual firing decisions may be made on a firing opportunity by firing opportunity basis. That is, in the context of the firing fraction calculator 112, the currently desired firing fraction can be re-determined before each firing opportunity based on the manifold absolute pressure or other operating parameters. Facilitating such dynamic tracking of the desired firing fraction allows the controller 100 to be particularly responsive to changing demands (e.g., change in the manifold absolute pressure or other engine parameters) while maintaining the benefits of skip fire operation.

In the illustrated embodiment, the engine controller 100 and the firing timing determination module 120 are arranged to generate a firing sequence or a sequence of fire and skip commands to the firing control unit 140. The firing control unit 140 assigns each command to a particular working chamber and operates the working chambers accordingly. When a working chamber is skipped, in a preferred embodiment the working chamber is deactivated. That is, air does not pass through the working chamber (e.g., through both the intake valve and the exhaust valve during the skipped working cycle.) Additionally, the working chamber is not fueled during the skipped working cycle.

The deactivation of a working chamber may be performed in a variety of ways. For example, a working chamber may be deactivated to form a low pressure spring. In this case, air is not allowed through the intake valve and is not allowed to escape through the exhaust valve during a working cycle, which creates a vacuum within the working chamber. The deactivation of a working chamber may also involve a high pressure spring. In this case, exhaust gases from the firing of a working chamber from the previous engine cycle for that cylinder are not released from the chamber i.e., the exhaust valve is not opened after the firing. Any of these deactivation schemes as well as others not specifically mentioned here may be used in the context of engine controller 100.

Figure 2:
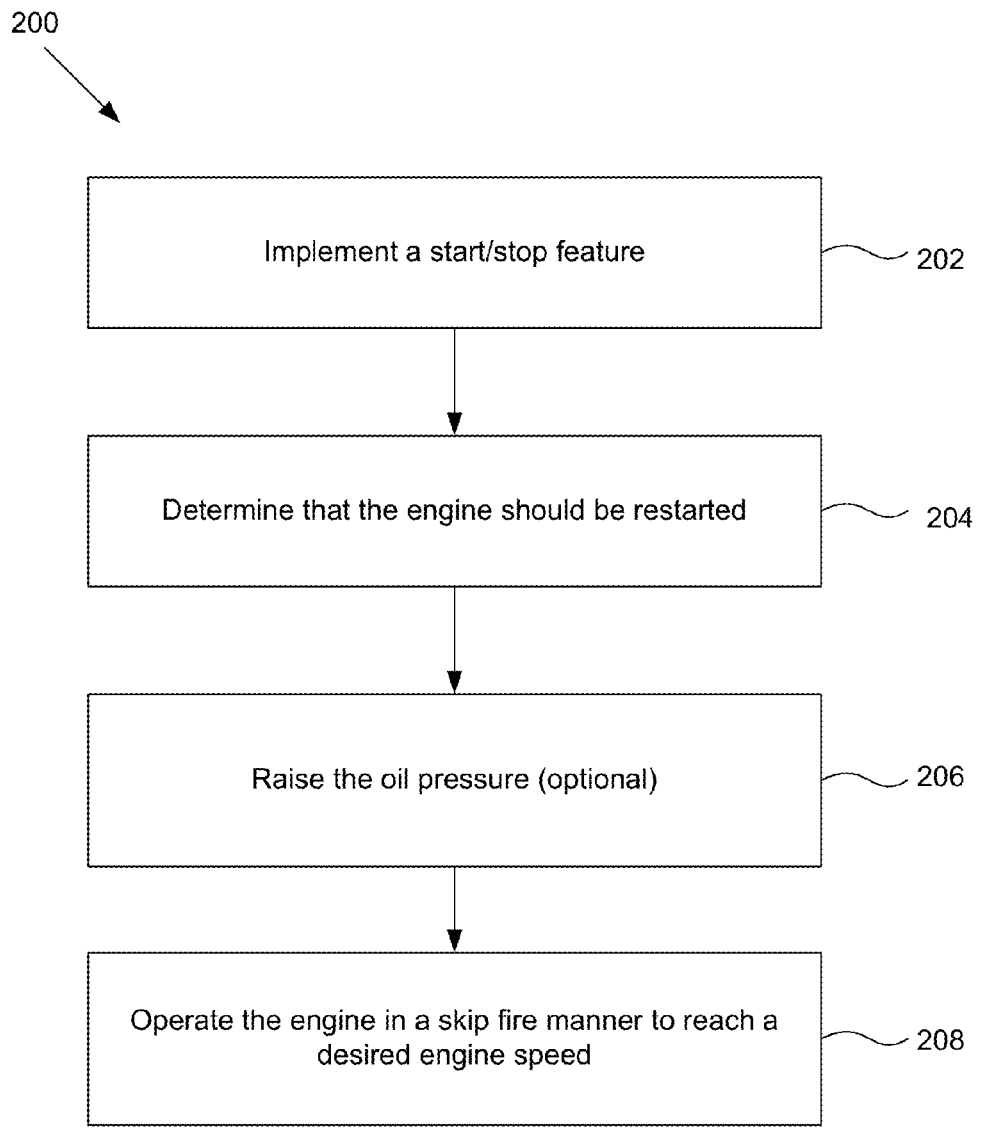
FIG. 2 is a flow chart that diagrammatically illustrates a method for implementing a start/stop feature in a skip fire engine control system according to one embodiment of the present invention.

Referring next to FIG. 2, a method 200 for implementing a start/stop feature according to a particular embodiment of the present invention is shown. The engine controller 100 or any suitable skip fire engine control system may perform the operations illustrated in FIG. 2.

Initially, at step 202, a start/stop feature is implemented. Generally, a start/stop feature involves shutting down an engine automatically during a vehicle drive cycle under selected conditions to conserve fuel. Any known start/stop-related technologies or techniques may be used when implementing the start/stop feature.

After determining that the engine should be shut down in accordance with the start/stop feature, the engine start/stop management unit then determines that the engine should be restarted (step 204). Any known techniques or conditions may be used to determine when a restart should occur. In various embodiments, for example, the restart is at least in part a response to the release of the brake pedal and/or the depression of the accelerator pedal.

Optionally, in preparation for the restart of the engine, the oil pressure is raised (step 206). In various vehicle designs, the intake and exhaust valves for each working chamber are electro-hydraulically controlled and/or controlled through oil pressure. Alternatively, in some applications, the intake and exhaust valves may be actuated using direct electro-mechanical actuation. The skipping of a working cycle requires control of the valves so that the working chamber can be deactivated. As a result, prior to the restart of the engine, the oil pressure is increased to enable the selective deactivation of the valves.

The raising of the hydraulic/oil pressure may be performed in a variety of ways. For example, an auxiliary pump may be used to increase the oil pressure to a suitable level. Alternatively, if an integrated starter-generator is available, the ISG may be used to increase the engine speed to a suitable level during the crank phase. The hydraulic/oil pressure will increase as the engine speed is increased, thus allowing for the deactivation of the working chambers. Any other suitable technique for raising the oil or hydraulic pressure sufficiently to enable valve control and cylinder deactivation may be used. If direct electro-mechanical intake and exhaust valve actuation is used, then step 206 may be skipped.

Once the deactivation of working chambers is enabled, the engine is then operated in a skip fire manner such that a desired engine speed is reached (step 208). In some embodiments, the engine is operated in a skip fire manner until both a desired engine speed and operating load are reached. The skip fire operation of the engine may be performed in a wide variety of ways. In various embodiments, for example, the firing fraction calculator 112 generates a firing fraction. The generated firing fraction may be dynamically adjusted during the engine startup phase, based on suitable engine parameters, such as the manifold absolute pressure, engine speed, coolant temperature and oil temperature. In some embodiments, the restart coordinator 103 selects an engine speed restart profile involving a predetermined set of firing fraction adjustments. The selection of a suitable engine speed restart profile may also be based on operator actions, such as the release of the brake pedal or the accelerator pedal position. The firing timing determination module then generates a firing sequence based on the firing fraction. The firing sequence is then used to operate the engine. In other embodiments, the restart coordinator 103 arranges for the firing timing determination module 120 to select one from a set of predetermined firing sequences, which is then used to operate the engine in a skip fire manner during the engine start phase.

The above techniques may be used in any suitable engine system, as long as the engine system is capable of skip fire operation. Additional benefits may be obtained by applying some of the above techniques in a hybrid powertrain system that includes an integrated starter-generator (ISG). More specifically, the operation of the ISG and the engine may be coordinated to facilitate engine restart for a start/stop feature.

Figure 3:
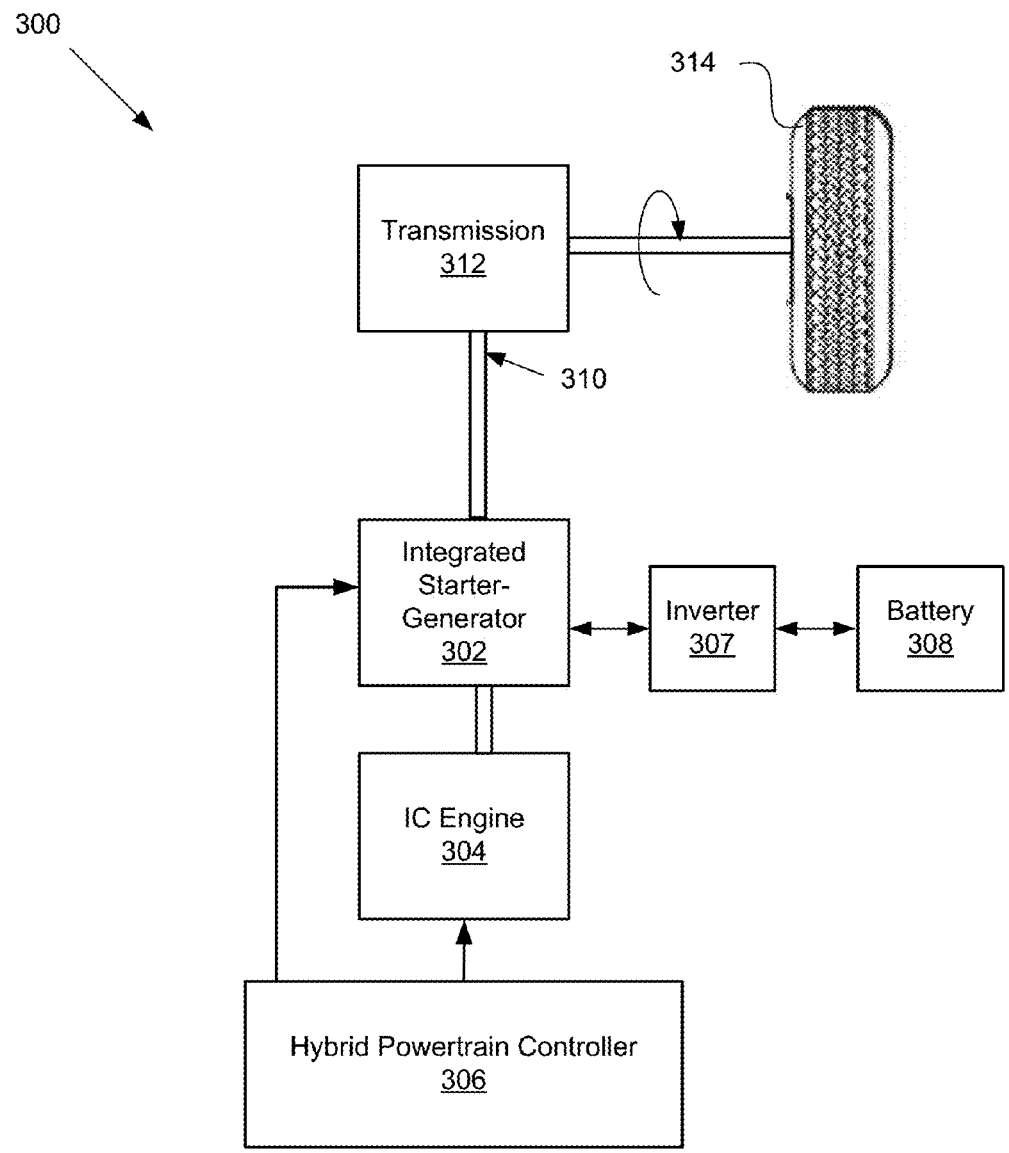
FIG. 3 is a block diagram of a skip fire engine control system and a hybrid powertrain according to one embodiment of the present invention.
Figure 4:
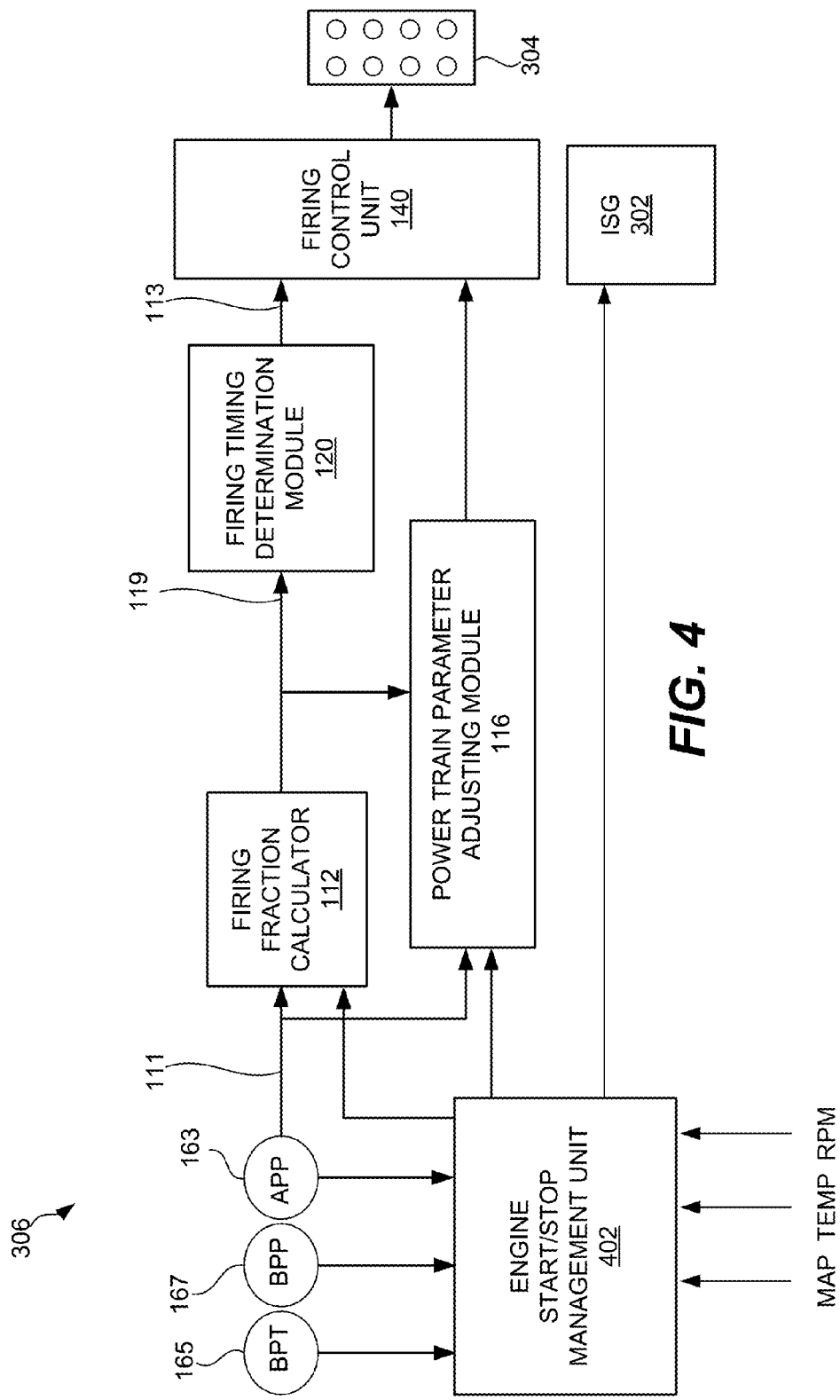
FIG. 4 is a block diagram of an example skip fire engine controller implementing a start/stop feature with an integrated starter-generator.

Referring next to FIG. 3, a hybrid powertrain system 300 according to a particular embodiment of the present invention will be described. The hybrid powertrain system 300 includes a hybrid powertrain controller 306, an internal combustion engine 304, an integrated starter-generator (ISG) 302, an inverter 307, a high voltage battery 308 and a transmission 312. The engine 304 and/or the ISG 302 are arranged to apply torque to the crankshaft 310, which drives the wheels 314 through the transmission 312. The hybrid powertrain controller 306, which is described in greater detail in FIG. 4, is arranged to coordinate the operation of the engine 304 and the ISG 302. All the various elements shown in FIG. 3 may optionally include an integrated controller (not shown in FIG. 3).

The ISG 302 replaces a conventional starter and is able to rapidly restart an engine that has been shut down due to the implementation of a start/stop system. In the illustrated embodiment, the ISG 302 is a crankshaft-integrated ISG. That is, the ISG 302 is connected to the crankshaft and positioned between the transmission 312 and the IC engine 304. However, any suitable ISG, such as a belt-alternator type ISG 302, may also be used, which may require a different powertrain architecture.

The ISG 302 is coupled with a battery 308 via the inverter 307 and a powertrain 310. The ISG 302 is arranged to discharge the battery and use the electrical power to apply torque to the powertrain when operated in a motoring mode. The inverter 307 converts the DC battery output into a high voltage AC output suitable for operating the ISG 302. The applied torque rotates the engine and is able to increase the engine speed to a desired level during an engine start phase. The ISG 302 is also arranged to subtract torque from the powertrain to charge the battery 310 when operated in a generating mode by converting mechanical energy produced by the engine to electrical energy for charging the battery. Again the inverter 307 facilitates conversion of the high voltage AC electrical supply generated by the ISG 302 to the DC supply required by the battery 308.

It should be appreciated that the aforementioned components and features may be integrated into a variety of hybrid powertrain architectures, including series hybrids, in which the engine is incapable of directly driving the wheels. The described techniques may also be applied to either mild hybrids or full hybrids. (Mild hybrids involve hybrid powertrain systems in which the ISG 302 is incapable of independently supplying sufficient power to the wheels to propel the vehicle, although such systems are capable of adding torque to the powertrain together with the engine. In a full hybrid, the ISG alone can be used to directly power the wheels.)

Referring next to FIG. 4, the hybrid powertrain controller 306 illustrated in FIG. 3 will be described. The hybrid powertrain controller 306 includes a firing fraction calculator 112, firing timing determination 120, firing control unit 140 and an engine start/stop management unit 402. The engine start/stop management unit 402 may contain a restart coordinator 103 similar to that shown in FIG. 1 (not shown in FIG. 4). The illustrated components may perform similar or the same operations as their counterparts in FIG. 1. A distinctive characteristic of the hybrid powertrain controller 306 is that the engine start/stop management unit 402 also manages the integrated starter-generator 302 and coordinates the operation of the ISG 302 and the internal combustion engine 304. The hybrid controller 306 may also include a preprocessor between the APP 163 and the firing fraction calculator 112 and a restart coordinator as part of the engine stop/start management unit. These components are not shown in FIG. 4.

Figure 7:
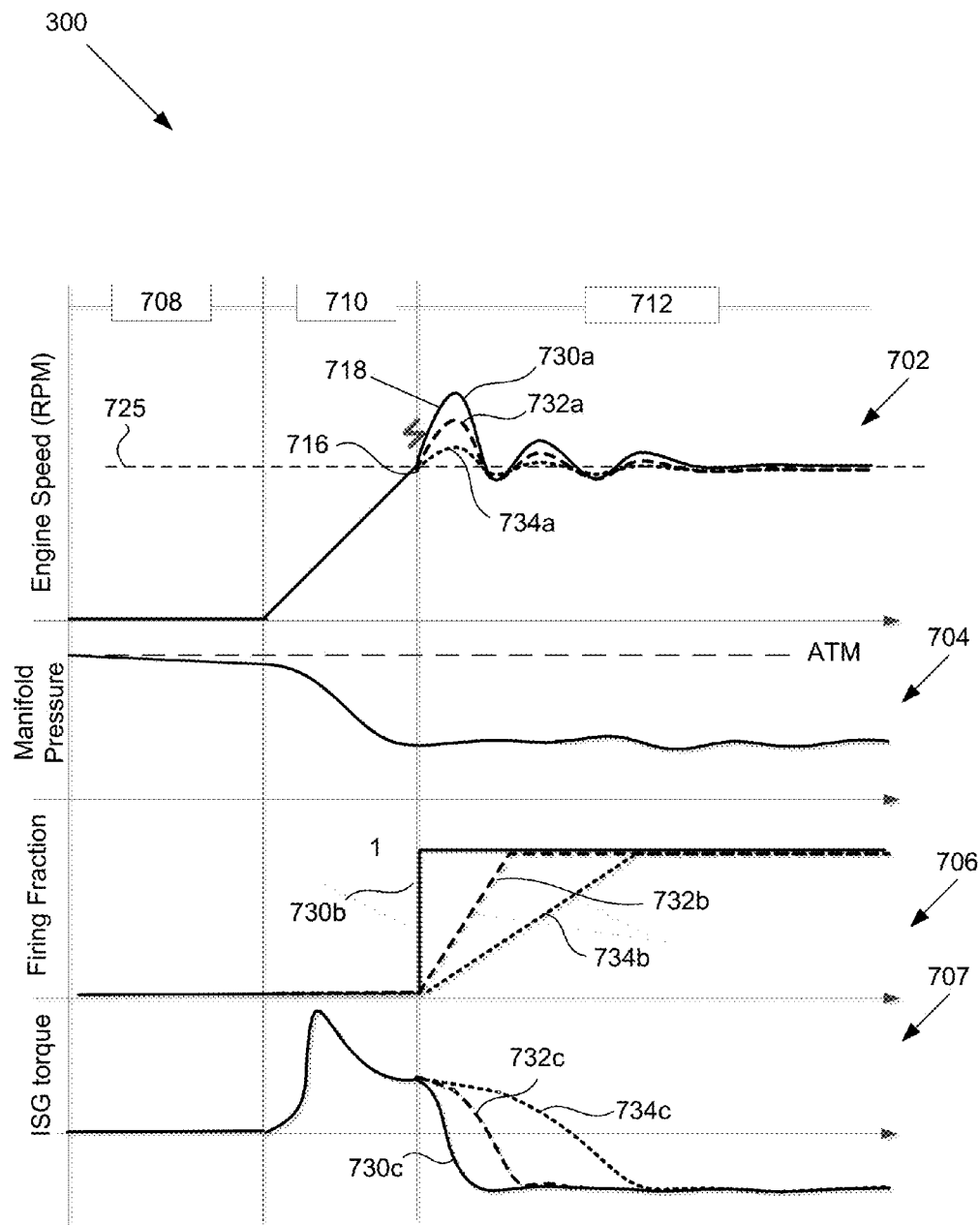
FIG. 7 is a graph that diagrammatically illustrates changes in engine speed, manifold absolute pressure and firing fraction over time according to a particular embodiment of the present invention.

More specifically, during restart after the engine is shut down due to the implementation of a start/stop system, the engine start/stop management unit 402 instructs the ISG 302 to apply torque to the powertrain. This torque causes the engine speed to increase. In one embodiment, during this period, no firings take place until a particular engine speed threshold is reached. In some embodiments, this threshold is a desired idle speed. In other embodiments, the desired threshold is an engine speed that helps raise hydraulic/oil pressure to a level sufficient to enable the deactivation of working chambers. Once the threshold is reached, the engine start/stop management unit 402, the firing fraction calculator 112, the firing timing determination module 120 and/or the firing control unit 140 then operate the engine in a skip fire manner as previously described in connection with FIGS. 1-2. The engine start/stop management unit 402 is arranged to ensure that the operation of the ISG 302 and the skip fire engine operation are properly coordinated. Referring next to FIG. 7, an example of such coordination will be described. FIG. 7 illustrates multiple graphs that compare the performance of skip fire and conventional, non-skip fire engine systems. Graphs 702, 704, 706 and 707 indicates changes over time in engine speed, manifold absolute pressure, firing fraction and integrated starter-generator torque. The curves with solid lines (730*a*, 730*b*, 730*c*) involve a non-skip fire, conventional engine system that fires every working chamber during each engine cycle. The curves with dotted (734*a*, 734*b*, 734*c*) and dashed lines (732*a*, 732*b*, 732*c*) involve various skip fire engine approaches. The changes in the various parameters are mapped over three time periods, an engine shutoff phase 708, a crank phase 710 and an engine idle phase 712.

During the engine shutoff phase 708, the engine has been shut down due to implementation of a start/stop feature. Accordingly, in graph 702 the engine speed starts at zero and the manifold absolute pressure is at atmospheric pressure, as shown in graph 704. During the crank phase 710, which immediately follows the engine shutoff phase 708, the integrated starter-generator 302 is activated and applies torque to the powertrain, as indicated by the rise in ISG torque shown in graph 707 and the rise in engine speed shown in graph 702. No firings take place at the engine 304 during this phase 710. In this particular example, the ISG 302 draws energy from the battery 308 in order to produce torque until an idle engine speed threshold 725 is reached. Once the idle engine speed threshold 725 is reached, working chambers are fired and the internal combustion engine begins to apply torque to the powertrain to help maintain the idle speed. This phase is referred to as the engine idle phase 712. For some time into the engine idle phase 712, the ISG 302 produces residual torque. In the beginning of the engine idle phase 712, the ISG still contributes a declining amount of torque to the powertrain, but in time, the ISG subtracts torque from the powertrain to charge the battery 308, as indicated in graph 707.

As indicated by the solid line curves (730*a*, 730*b*, 730*c*), the non-skip fire, conventional approach has quite different results from the skip fire approaches. With the non-skip fire, conventional engine, once firings begin again at the beginning of the engine idle phase 712, all of the working chambers must be fired, as indicated in graph 706 (i.e. firing fraction=1). Although use of the ISG 302 has somewhat reduced the manifold pressure during the cranking phase 710, as shown in graph 704, the ISG is still generating residual torque until the engine begins to produce torque, as indicated by graph 707. The ISG will continue to apply torque and operate in a motoring mode until the engine is running Once the engine is firing at the beginning of the engine idle phase 712, the ISG torque will begin to decrease down to a negative generating torque level as the engine maintains the idle speed. As the engine begins to fire all cylinders the ISG changes operation from a motoring to generating mode. During this transition, the combination of a somewhat high manifold pressure, the residual ISG torque and all cylinder operation causes an undesirable engine speed surge 718 that overshoots the desired engine speed target 725, as shown in graph 702.

Skip fire engine control may be implemented to address the above issues. As indicated by the curves with dotted 734*b* and dashed 732*b* lines in graph 706, the engine start/stop management unit 402 and/or the firing fraction calculator 112 can adjust the firing fraction more gradually and/or dynamically. As previously discussed, in some implementations, the firing fraction is increased or changed based on changes in the manifold absolute pressure, engine speed, coolant pressure, oil pressure or other operating parameters. Additionally, in various embodiments, the engine start/stop management unit 402 and/or the firing fraction calculator 112 takes into account the torque generated by the ISG 302 when determining a suitable firing fraction. As a result, as shown by the dotted 734*a* and dashed 732*a* curves in graph 702, the engine speed surge is reduced or substantially eliminated as engine cylinder firings are dynamically increased in coordination with the engine and ISG operation.

Similar to the approach illustrated in FIG. 6, FIG. 7 illustrates the use of two different engine speed restart profiles. That is, in one approach, as represented by the dashed line curve 732*b* in graph 706, the firing fraction is increased more rapidly than in the other approach, which is represented by the curve with the dotted lines 734*b*. In some situations, for example, an operator may indicate that they desire a steeper, more rapid increase in engine output e.g., by pressing quickly down on the accelerator pedal. In various implementations, the firing fraction calculator 112 takes into account the accelerator pedal position/acceleration and/or other engine parameters in selecting a suitable engine speed restart profile. That is, the rate of increase or change in the firing fraction can be based on a variety of engine and/or vehicle parameters, including but not limited to accelerator pedal position. In another implementation, the rate of firing fraction increase may be adjusted to account for the road gradient if the vehicle is not operating on a level road.

Figure 8:
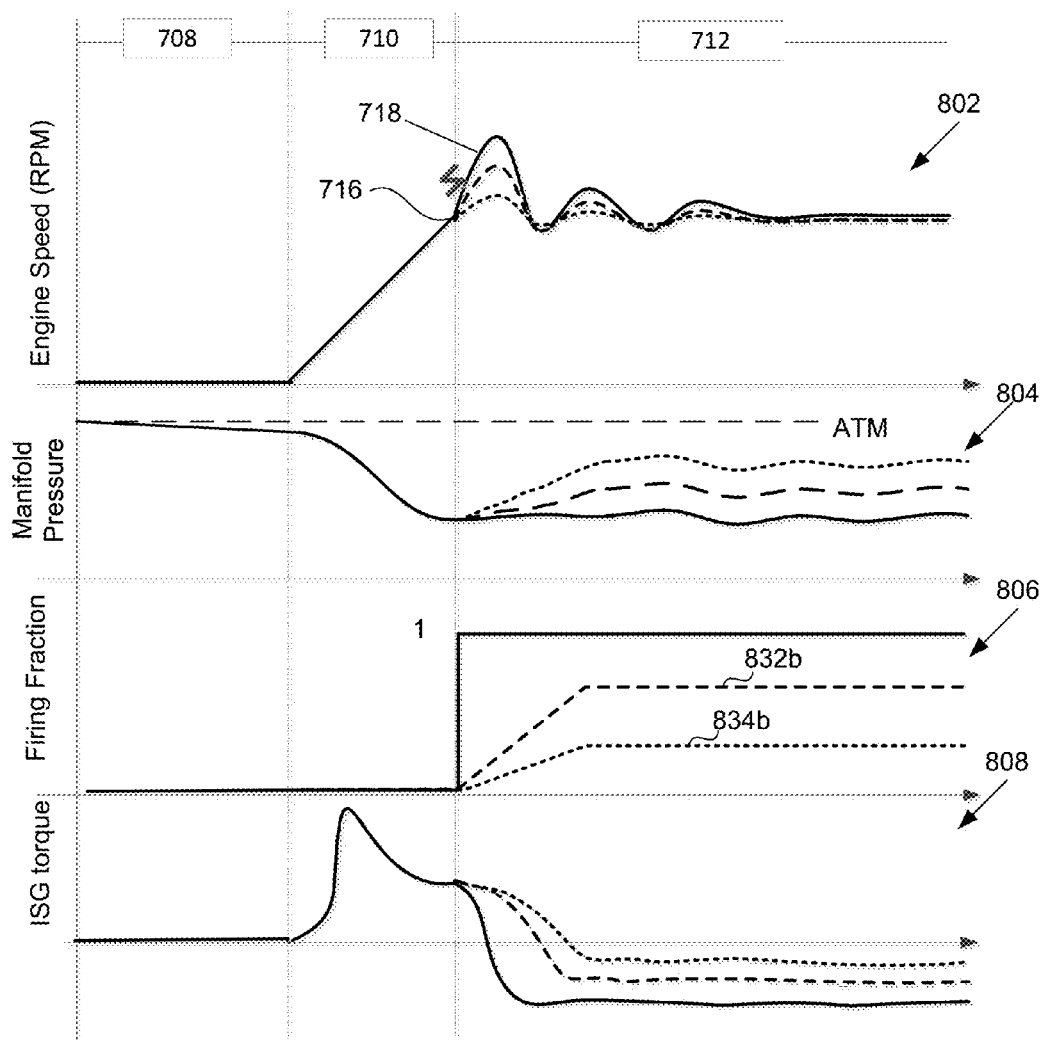
FIG. 8 is a graph that diagrammatically illustrates changes in engine speed, manifold absolute pressure and firing fraction over time according to another embodiment of the present invention.

Once skip fire engine operation commences, the firing fraction is typically increased until a suitable target firing fraction is reached. The target firing fraction may vary, depending on the needs of a particular application. For example, in the illustrated embodiment of FIG. 7, as indicated in graph 706, during the engine idle phase 712, the skip fire firing fractions (i.e., as represented by the dashed 732*b* and dotted 734*b* curves) are increased gradually from 0 to 1 (i.e., all working chambers are fired during each engine cycle.) Once the firing fraction of 1 is achieved, this fraction is maintained while the engine 304 is idling. However, the idle speed may be maintained with less than a firing fraction of 1. In one implementation, a firing fraction less than 1 may be used to further reduce fuel consumption while the engine is running when no accessory loads are present. In another implementation, the target firing fraction during idle may be increased to compensate for additional accessory loads such as climate control, alternator loading, etc. while still reducing overall fuel consumption compared to all cylinders firing. Furthermore, the target firing fraction during the idle phase may be less than one in order to reduce the generated electrical energy for recharging the battery as the battery state-of-charge increases to near full capacity. The hybrid powertrain controller 306 may adjust the target firing fraction during idle to balance fuel consumption and battery state-of-charge. FIG. 8, for example, illustrates a set of graphs similar to those of FIG. 7. One difference, however, is that the skip fire firing fraction (indicated by the dotted 834b and dashed 832b line curves in graph 806) is increased to a fraction that is lower than 1. That is, in this particular embodiment during the engine idle phase 712, less than all of the available working chambers are fired while the engine 304 is idling. During the engine idle phase 712, any suitable firing fraction may be used that is adequate to support a desired idle engine speed.

The timing of the transition from the ISG 302 to the engine 304 may be varied as well by the engine start/stop management unit 402. In the embodiment illustrated in FIGS. 7 and 8, for example, during the crank phase 710, the ISG 302 was used to apply torque to the powertrain and no firings took place until the engine 304 reached a target idle speed. After the idle speed was reached and during the engine idle phase 712, firings commenced to maintain the idle speed as commanded by the engine start/stop management unit 402. In other embodiments, however, the firings of the working chambers may be initiated earlier by the engine start/stop management unit 402. An example of this approach is illustrated in FIG. 9.

Figure 9:
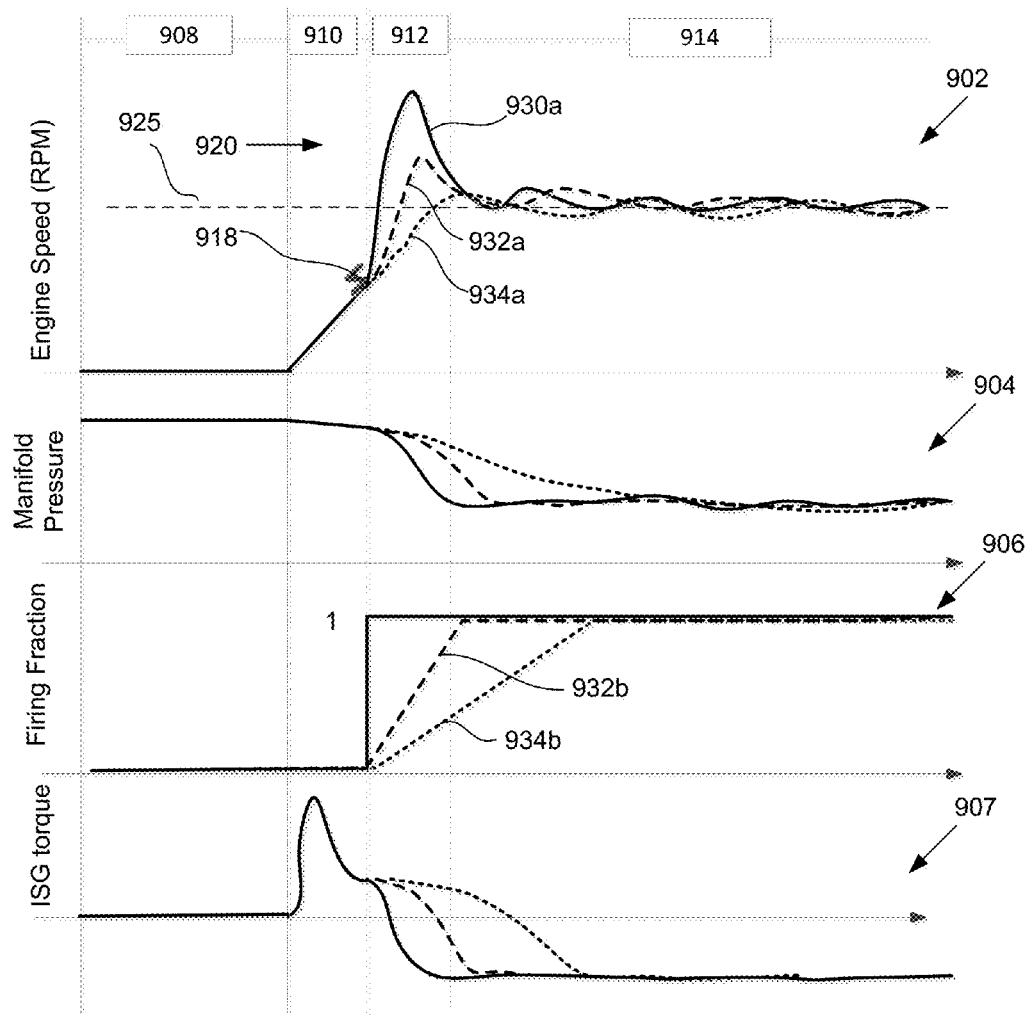
FIG. 9 is a graph that diagrammatically illustrates changes in engine speed, manifold absolute pressure and firing fraction over time according to another embodiment of the present invention.

FIG. 9 includes graphs 902, 904, 906 and 907 that indicate changes in manifold absolute pressure, engine speed, ISG torque and firing fraction over time. Time is divided into four phases, an engine stopped phase 908, a crank phase 910, an engine start phase 912 and an engine idle phase 914. During the engine stopped phase 908, the engine speed is zero, the intake manifold pressure is atmospheric pressure, no firings are taking place and the ISG torque output is zero. During the initial crank phase 910, the engine start/stop management unit 402 commands the ISG 302 to apply torque to the powertrain to help raise the engine speed and no firings take place. Firings begin earlier than in the implementations illustrated in FIGS. 7 and 8, once the engine speed reaches a particular engine speed threshold 918, which is lower than the idle engine speed. Once that threshold is reached, the engine start phase 912 begins and engine start/stop management unit 402 commands the engine 304 to begin firing working chambers and the firing fraction increases until the idle engine speed 925 is achieved. Put another way, in FIG. 9, the ISG 302 and the engine 304 collaborate to help the engine reach an idle speed 925 during the engine start phase 912. In various implementations the crank phase 910 and engine start phase 912 together have a duration of less than 500 milliseconds or approximately between 250 and 500 milliseconds. In some embodiments a crank phase 910 and engine start phase 912 together may have a duration as long as 2.5 seconds. In FIGS. 7 and 8, by contrast, the ISG 302, without assistance from the engine, brings the engine speed up to a target idle speed 925, during an example crank phase 710 that has approximately the same duration. An advantage of the control method described in FIG. 9 is that less battery charge is required to bring the engine to idle since engine firings begin before the engine speed reaches idle.

The engine speed threshold 918 may vary between different implementations. In some embodiments, for example, the engine speed threshold is intended to prepare the engine for skip fire operation. As previously discussed, in some designs, the valves for the working chambers are controlled through hydraulic or oil pressure. Hydraulic/oil pressure tends to increase when the engine speed increases. In various implementations, the engine speed threshold 918 is a speed that is sufficient to ensure that the valves are controllable and that the working chambers can be deactivated.

As in some of the aforementioned implementations, the skip fire approaches illustrated in FIG. 9 are intended to reduce engine speed overshoot. As shown by the solid line curve 930a in graph 902, in a conventional, non-skip fire engine, the combination of the high absolute manifold pressure, all cylinder operation and the residual torque applied by the ISG 302 cause an undesirable engine speed surge 920 during the engine start phase 912. As indicated by the dotted 934a and dashed 932a line curves in graph 902, skip fire engine control is designed to reduce or almost eliminate that surge. As indicated by the dashed 932b and dotted 934b line curves in graph 906, the skip fire firing fractions increase gradually rather than abruptly, which better corresponds to the changes in the absolute manifold pressure and the ISG torque and helps reduce any engine speed overshoot.

It should be appreciated that for a hybrid vehicle engine start/stop is not just applicable for a stopped vehicle. Engine stop and restart may occur while the vehicle is in motion. In such cases a restart may target an engine speed threshold synchronous to the driveline rotational speed at the current gear ratio and vehicle speed. Such a restart may be called a rolling engine restart and skip fire control may be used during the restart. The engine speed threshold, where at least one of the working chambers begins firing, is adjustable and need not be at the engine idle speed. Also in some cases the desired engine speed can be achieved while skipping at least one working chamber, i.e. the firing fraction after reaching the engine speed threshold may be less than one. During the entire sequence from stopping the engine to completing the engine restart the vehicle remains in motion.

Figure 5:
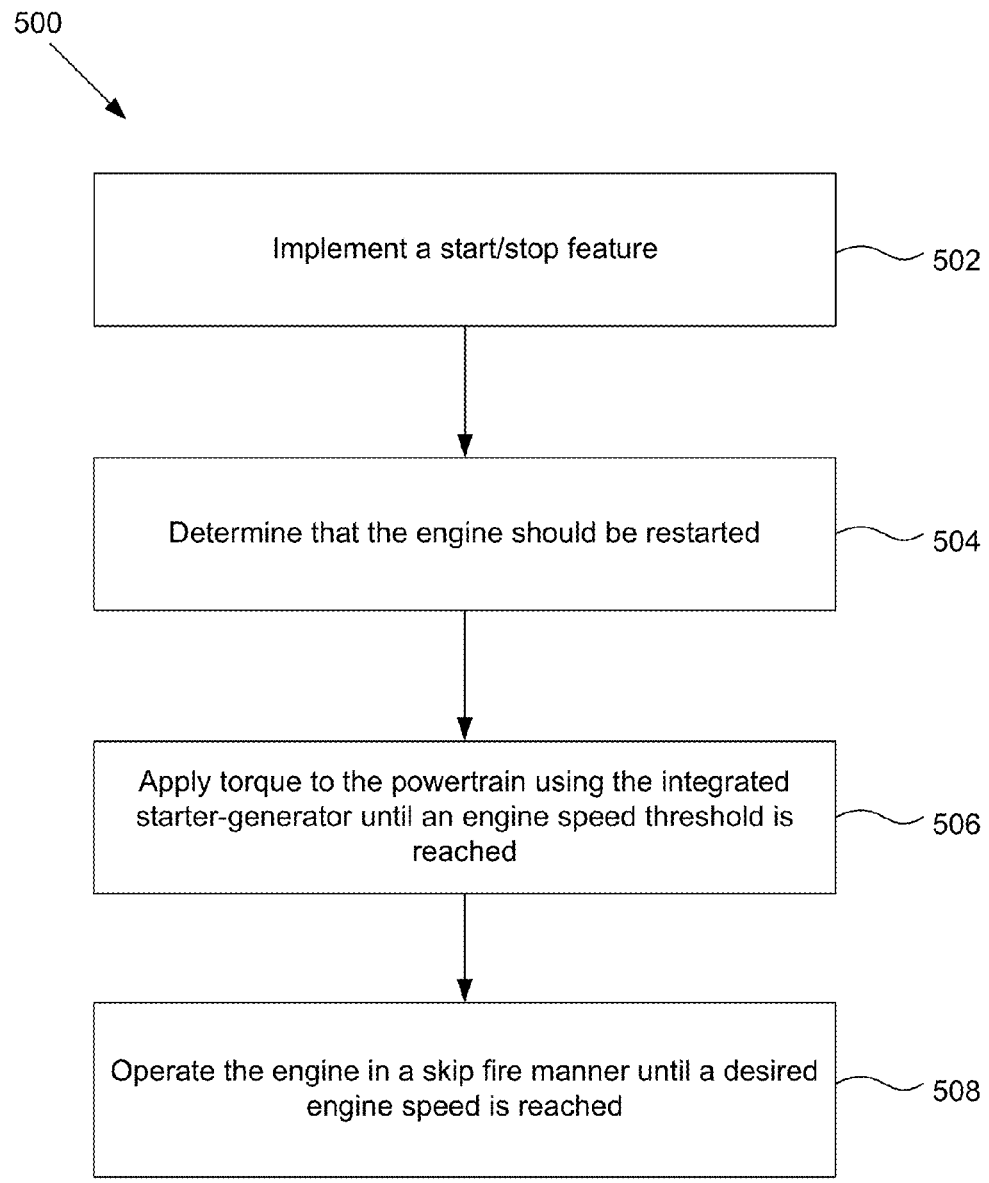
FIG. 5 is a flow chart that diagrammatically illustrates an example method for implementing a start/stop feature using an integrated starter-generator.

Referring next to FIG. 5, an example method 500 for implementing a start/stop feature in a hybrid powertrain system 300 with an integrated starter-generator 302 will be described. In various embodiments, the method 500 is performed by the hybrid powertrain system 300 illustrated in FIG. 3 and/or the hybrid powertrain controller 306 illustrated in FIG. 4.

At step 502, a start/stop feature is implemented (e.g., similar or the same as step 202 of FIG. 2.) The engine is thus shut down in accordance with the start/stop feature. The engine start/stop management unit 402 then determines that an engine restart should be performed (step 504). This determination may be based on any suitable operating parameters, such as input indicating that the brake pedal was released or other triggers as previously described.

Afterward, the integrated starter-generator 302 applies torque to the powertrain such that a particular engine speed threshold is reached (step 506). This engine speed threshold may vary depending on the needs of a particular application. In some embodiments, for example, the engine speed threshold is an engine speed used when the engine is idling. In other embodiments, the engine speed threshold is a (minimum) engine speed that helps ensure that skipped working chambers can be deactivated. That is, the engine speed threshold is an engine speed that sufficiently raises hydraulic or oil pressures so that the working chamber valves can be selectively closed and opened using a camshaft with lost motion type valve lifters. In other embodiments, that use electronic valve actuation, a sufficient oil pressure may not be a requirement for valve deactivation.

Once the engine speed threshold is reached, the engine is operated in a skip fire manner during an engine start phase (step 508). In some embodiments, the skip fire operation of the engine begins before the engine speed has reached an idle speed, and the skip fire operation is calibrated to help achieve the idle speed. Once the engine speed threshold is reached, the ISG optionally no longer uses electrical power to actively apply torque to the powertrain, although the ISG may still apply some residual torque to the powertrain (e.g., as shown in FIG. 9) During the engine start phase, the engine applies torque to the powertrain to help increase the engine speed.

Any of the skip fire engine control techniques previously discussed in connection with engine controller 100 of FIG. 1 may be implemented by the hybrid powertrain controller 306 in the method 500 to generate any of the results illustrated in FIGS. 7-9. In various embodiments, for example, the firing fraction calculator 112 and/or the engine start/stop management unit 402 selects an engine speed restart profile from a set of engine speed restart profiles. Each profile may involve a different predetermined series of firing fraction adjustments (e.g., selected by the firing fraction calculator 112) or a predetermined firing sequence (e.g., selected by the firing timing determination module 120). In some implementations, the firing fraction calculator 112 and/or the firing timing determination module 120 adjust the firing fraction and/or firing sequence dynamically based on a variety of operating parameters, including but not limited to the manifold absolute pressure, ISG torque, engine speed, coolant temperature, oil temperature and accelerator pedal position. In various embodiments, such adjustment takes place on a firing opportunity by firing opportunity basis, although this is not a requirement.

The invention has been described primarily in the context of controlling the firing of 4-stroke piston engines suitable for use in motor vehicles. However, it should be appreciated that the described skip fire approaches are very well suited for use in a wide variety of internal combustion engines. These include engines for virtually any type of vehicle—including cars, trucks, boats, construction equipment, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkinson cycle engines, Wankel engines and other types of rotary engines, mixed cycle engines (such as dual Otto and diesel engines), radial engines, etc. It is also believed that the described approaches will work well with newly developed internal combustion engines regardless of whether they operate utilizing currently known, or later developed thermodynamic cycles.

In some preferred embodiments, the firing timing determination module utilizes sigma delta conversion. Although it is believed that sigma delta converters are very well suited for use in this application, it should be appreciated that the converters may employ a wide variety of modulation schemes. For example, pulse width modulation, pulse height modulation, CDMA oriented modulation or other modulation schemes may be used to deliver the drive pulse signal. Some of the described embodiments utilize first order converters. However, in other embodiments higher order converters or a library of predetermined firing sequences may be used.

It should be appreciated that the engine/hybrid powertrain controller designs contemplated in this application are not limited to the specific arrangements shown in FIGS. 1 and 4. One or more of the illustrated modules may be integrated together. Alternatively, the features of a particular module may instead be distributed among multiple modules. The controller may also include additional features, modules or operations based on other co-assigned patent applications, including U.S. Pat. Nos. 7,954,474; 7,886,715; 7,849,835; 7,577,511; 8,099,224; 8,131,445; and 8,131,447; U.S. patent application Ser. Nos. 13/774,134; 13/963,686; 13/953,615; 13/886,107; 13/963,759; 13/963,819; 13/961,701; 13/963,744; 13/843,567; 13/794,157; 13/842,234; 13/004,839, 13/654,244; 13/004,844; 14/207,109; and 13/681,378 and U.S. Provisional Patent Application Nos. 61/952,737 and 61/879,481, each of which is incorporated herein by reference in its entirety for all purposes. Any of the features, modules and operations described in the above patent documents may be added to the illustrated controllers 100 and 306. In various alternative implementations, these functional blocks may be accomplished algorithmically using a microprocessor, ECU or other computation device, using analog or digital components, using programmable logic, using combinations of the foregoing and/or in any other suitable manner.

This application sometimes refers to a crank phase, an engine (re)start phase or an engine startup period during which skip fire operation is used. The actual time involved in a crank phase and/or an engine start phase may vary. In some implementations, for example, the crank phase (e.g., as indicated by crank phases 608 and 710 in FIGS. 6-8) has a duration of less than 500 milliseconds or approximately between 250-500 milliseconds. In some embodiments (e.g., as indicated in FIG. 9) the crank phase 910 and the engine start phase 912 together have a duration of less than 500 milliseconds or approximately between 250-500 milliseconds, although in both cases longer and shorter durations are also possible. The crank and/or engine start phases immediately follow a period during which the engine was shut down due to implementation of a start/stop system.

It should be appreciated that the use of skip fire engine operation is not necessarily limited to times when the engine is being restarted, but may also be used during engine shutdown. In some embodiments, for example, the engine is operated in a skip fire manner as the engine speed is dropping from a non-zero speed to a zero speed. The engine is operated in a skip fire manner until the engine speed reaches zero. Put another way, in various embodiments, a stop/start feature involves operating an engine in a skip fire manner during an engine shutdown period in which the engine speed is decreasing, and the start/stop feature stops the engine at the end of the engine shutdown period.

Although only a few embodiments of the invention have been described in detail, it should be appreciated that the invention may be implemented in many other forms without departing from the spirit or scope of the invention. For example, the drawings and the embodiments sometimes describe specific arrangements, operational steps and control mechanisms. It should be appreciated that these mechanisms and steps may be modified as appropriate to suit the needs of different applications. For example, some or all of the operations and features of the engine start/stop management unit are not required and instead some or all of these operations may be transferred as appropriate to other modules, such as the firing fraction calculator and/or the firing timing determination unit. Additionally, although the methods illustrated in FIGS. 2 and 5 imply a particular order, it should be appreciated that this order is not required. In some embodiments, one or more of the described operations are reordered, replaced, modified or removed. FIGS. 6-9 illustrate changes in various engine/ISG parameters over time. It should be appreciated that the figures are intended to be exemplary and should not limit the invention in any way. Other implementations are possible that slightly or substantially depart from the graphs illustrated in the figures. Therefore, the present embodiments should be considered illustrative and not restrictive and the invention is not to be limited to the details given herein.

The present invention was developed as part of a joint research agreement between Tula Technology, Inc. and FCA US LLC.

What is claimed is:

1. A method for implementing a start/stop feature in a skip fire engine control system, the skip fire engine control system including an internal combustion engine having a plurality of working chambers, the method comprising:
   implementing a stop/start feature that involves automatically turning off the engine under selected circumstances during a drive cycle;
   determining that the turned off engine should be restarted; and
   during an engine startup period, operating the engine in a skip fire manner until a target engine speed is reached wherein the skip fire operation of the engine involves firing at least one selected working cycle of at least one selected working chamber and deactivating at least one selected working cycle of at least one selected working chamber such that air does not pass through the at least one working chamber during the at least one deactivated working cycle.

2. A method as recited in claim 1 wherein the engine is operated in a skip fire manner until the target engine speed and a target operating load are reached.

3. A method as recited in claim 1 wherein the deactivation of the at least one working chamber involves not fueling and not passing air through the at least one working chamber.

4. A method as recited in claim 1 wherein the engine startup period begins immediately after the engine was started and is less than 2500 milliseconds.

5. A method as recited in claim 1 wherein the target engine speed is achieved while skipping at least one working chamber.

6. A method as recited in claim 1 wherein the target engine speed is achieved while skipping a desired number of working chambers wherein the desired number of working chambers is a number between zero and the total number of working chambers in the engine and wherein the desired number of working chambers is selected based on one or more operating conditions.

7. A method as recited in claim 1 wherein the target engine speed is an idle speed.

8. The method of claim 1, wherein operating the engine in the skip fire manner comprises skipping the firing of selected cylinders during selected firing opportunities and a firing fraction is a ratio of firings to firing opportunities.

9. The method of claim 8, wherein during the engine startup period, the firing fraction starts at a first level and is adjusted at least once during the engine startup period.

10. The method of claim 9, wherein firing fraction is increased in a sequence of at least two or more steps during the engine startup period.

11. The method of claim 10, wherein the firing fraction is increased in a manner selected to reduce an engine speed overshoot.

12. The method of claim 8, wherein operating the engine in the skip fire manner comprises selecting the firing fraction and a firing sequence on a firing opportunity by firing opportunity basis.

13. The method of claim 8, wherein during the engine startup period, the firing fraction starts at a first level and is steadily increased to at least a second level.

14. The method of claim 8, wherein during the engine startup period, the firing fraction is dynamically adjusted based at least in part on a manifold absolute pressure to at least partially reduce an engine speed overshoot.

15. A method for implementing a start/stop feature in a skip fire engine control system, the skip fire engine control system including an internal combustion engine having a plurality of working chambers, the method comprising:
   implementing a stop/start feature that involves automatically turning off the engine under selected circumstances during a drive cycle;
   determining that the turned off engine should be restarted; and
   during an engine startup period, operating the engine in a skip fire manner so that an engine speed substantially follows a desired engine speed restart profile wherein the skip fire engine operation involves firing at least one selected working cycle of at least one selected working chamber and deactivating at least one selected working cycle of at least one selected working chamber such that air does not pass through the at least one working chamber during the at least one deactivated working cycle.

16. A method as recited in claim 15 wherein the engine speed restart profile indicates predetermined increases in a engine speed over time during the engine startup period.

17. A method as recited in claim 15 further comprising:
   selecting one of a plurality of predetermined engine speed restart profiles based on one or more engine parameters; and
   operating the engine in a skip fire manner during the engine startup period based on the selected one of the engine speed restart profiles.

18. A method as recited in claim 17 wherein the selection of the one of the engine speed restart profiles is based on an accelerator pedal position.

19. A method as recited in claim 17 wherein the plurality of engine speed restart profiles require different rates of increase in a firing fraction during the engine startup period.

20. A method as recited in claim 15 wherein the engine speed at the end of the engine startup period substantially matches an engine idle speed.

21. The method of claim 15, wherein operating the engine in the skip fire manner comprises selecting skipping the firing of selected cylinders during selected firing opportunities and a firing fraction is a ratio of firings to firing opportunities.

22. The method of claim 21, wherein during the engine startup period, the firing fraction starts at a first level and is adjusted at least once during the engine startup period.

23. The method of claim 21, wherein operating the engine in the skip fire manner comprises skipping the firing of selected cylinders during selected firing opportunities and a firing fraction is a ratio of firings to firing opportunities.

24. A method for implementing a start/stop feature in a skip fire engine control system, the skip fire engine control system including an internal combustion engine having a plurality of working chambers, the method comprising:
   implementing a stop/start feature that involves automatically turning off the engine under selected circumstances during a drive cycle; and
   during an engine shutdown period in which the engine speed is dropping from a non-zero speed to a speed of zero, operating the engine in a skip fire manner until the engine speed reaches zero wherein the skip fire operation of the engine involves firing at least one selected working cycle of at least one selected working chamber and deactivating at least one selected working cycle of at least one selected working chamber such that air does not pass through the at least one working chamber during the at least one deactivated working cycle.

\* \* \* \* \*